Aug. 2, 1955 P. WAGUET 2,714,689
ILLUMINATING SYSTEM
Filed May 17, 1949 2 Sheets-Sheet 1

Inventor:
Philippe Waguet,
by Vernet C. Kauffman
His Attorney.

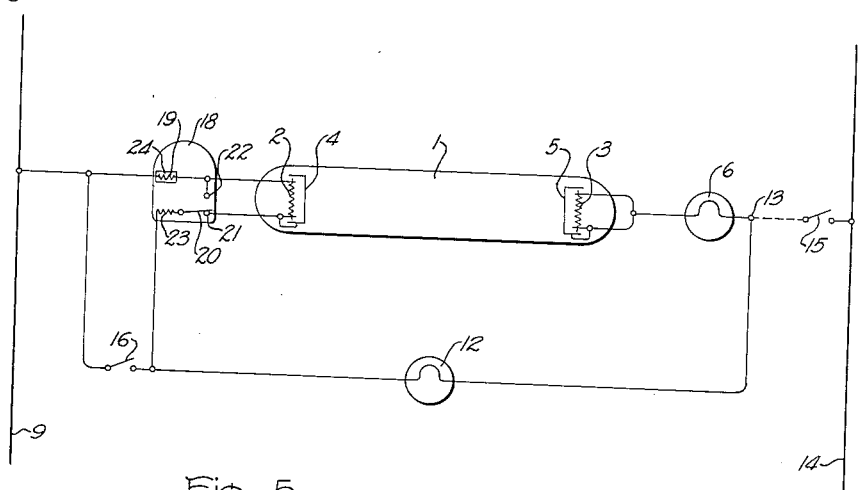
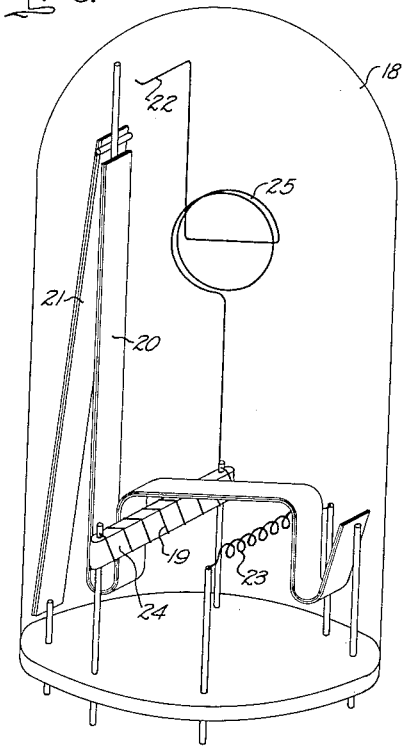

United States Patent Office 2,714,689
Patented Aug. 2, 1955

2,714,689

ILLUMINATING SYSTEM

Philippe Waguet, Paris, France, assignor to General Electric Company, a corporation of New York Application May 17, 1949, Serial No. 93,681

Claims priority, application France June 15, 1948

9 Claims. (Cl. 315—92)

This invention relates to a circuit for starting and operating discharge lamps of the type having at least one filamentary electrode adapted to be pre-heated.

An object of the invention is to provide such a circuit including a plurality of such discharge lamps, a ballast for each lamp, a plurality of incandescent lamps each connected in parallel with a discharge lamp and its ballast in which circuit either the discharge lamps or the incandescent lamps or a mixture of such lamps may be connected in series to provide illumination. Another object of the invention is to provide such a circuit in which the incandescent lamps are utilized to limit the pre-heat current of the filamentary electrode to the normal discharge current. Another object of the invention is to provide a switch for substituting, automatically in certain instances, the incandescent lamp for the discharge lamp and its ballast when either of the latter becomes defective. Still further objects and advantages of the invention will appear from the following detailed description of species thereof.

Figure 1:
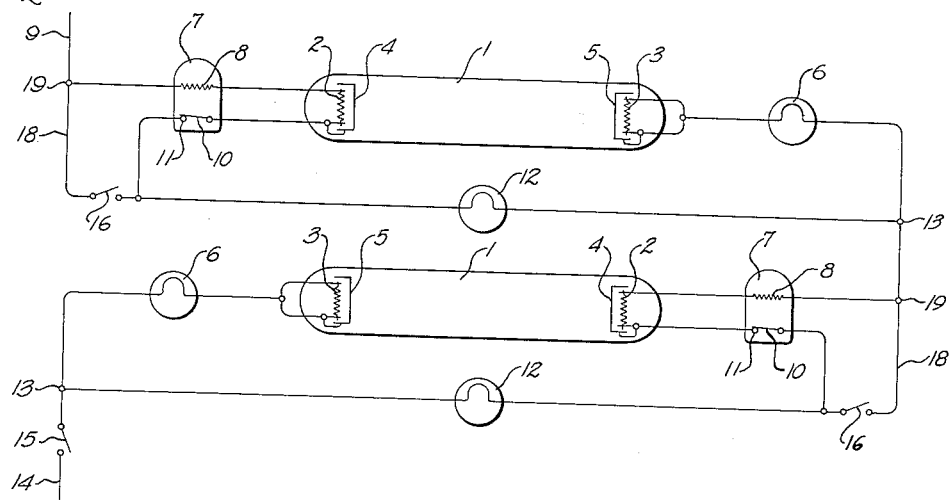
Figure 2:
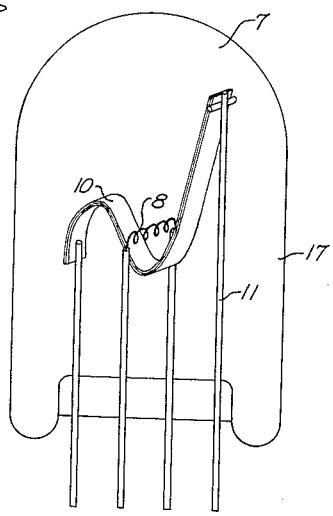
Figure 3:
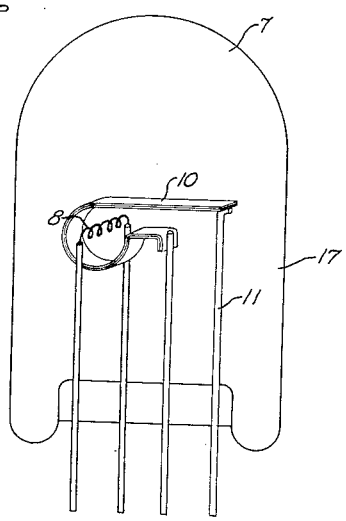

In the accompanying drawings, Fig. 1 is a schematic representation of the circuit comprising my invention; Figs. 2 and 3 are perspective views of two heat-responsive switches either of which may be employed in my invention; Fig. 4 is a schematic representation of a modification of my invention; and Fig. 5 is a perspective view of a heat-responsive switch which may be used in the modified circuit shown in Fig. 4.

Referring to Fig. 1, the circuit illustrated therein comprises a plurality (two, in this case) of gaseous electric discharge devices 1 electrically connected in series with each other, with ballast resistances in the form of incandescent lamps 6 and with switches 7 across the lines 9, 14 of a source of alternating or direct current. The devices 1 may be positive column discharge lamp devices similar to those disclosed in Patent No. 2,182,732, issued December 5, 1939, to Meyer et al., assigned to the General Electric Company, the assignee of this application. Devices of this type comprise elongated tubular envelopes coated internally with a suitable luminescent material and which contain a filling of rare gas, preferably argon, at a low pressure, and a small quantity of mercury. The electrodes 2, 3 sealed into the ends of the discharge devices 1 may be of the thermionic type with one of the electrodes 3 shorted (as illustrated). Said electrodes 2, 3 may be coiled-coils of wire, such as tungsten, coated with a material of high electron emissivity, such as an alkaline earth oxide like barium or strontium oxide or mixtures thereof. The ballast resistances 6 may, as illustrated, consist of incandescent tungsten lamps.

Each of the switches 7 comprises a sealed envelope containing an ionizable gas, a heating resistor 8, a heat-deformable strip 10, such as a bimetallic strip, a contact 11. The heating resistor 8 is connected between one side of the supply line 9 and one end of the pre-heat cathode 2. The other end of the cathode is connected to the strip 10, which is normally engaged with contact 11. An incandescent tungsten lamp 12 is connected between switch contact 11 and the side of the ballast resistor 6 remote from the discharge device 1. A switch 16 is connected across switch 7 to lamp 12 as illustrated. The incandescent tungsten lamp 12 is so chosen that its normal operating current is equal to that of the device 1 and its ballast lamp 6. Switch 16, which is normally open, may be a manually operated switch of any appropriate type. Switch 15 is a manual "on-off" switch which controls the entire series of lamps.

In operation; the circuit illustrated in Fig. 1 functions in the following manner:

When the main switch 15 is closed the circuit is energized and current flows through heater resistors 8, cathodes 2, strips 10, contacts 11, and incandescent lamps 12. Thus the lamps 12 provide light immediately on the closing of switch 15 and the electrodes 2 together with resistors 8 are heated. The bimetallic strips 10 are heated by resistors 8 and tend to change their shape and open the switches 7 in the circuit of the incandescent lamps 12. Due to unavoidable slight differences in their respective characteristics, the various switches 7 will open at different times. When one of the switches 7 opens, the bimetallic strips 10 of the switches 7 for the other discharge lamps 1 of the series are still closed and the line voltage is applied across the discharge lamp 1 corresponding to the open switch 7. The lamp 1 starts at the same time the incandescent lamp 12 goes out. The heaters 8 of the remaining switches 7 continue to carry a current of the same magnitude as the total resistance in the circuit remains unchanged after a discharge lamp 1 has been lighted. The other strips 10 move to their open position in turn and substitute discharge lamps 1 for incandescent lamps 12 in the circuit. The starting of series-connected discharge devices in this manner is disclosed and claimed in Reissue Patent No. 22,503—Campbell, originally Patent No. 2,266,619, issued December 16, 1941, and assigned to the assignee of this application.

When a discharge lamp 1 or a stabilizing lamp 6 becomes defective in operation, the series goes out and the bimetallic strips 10 move to their closed positions one after the other. When the strip 10 of only one switch 7 remains in its open position, the line voltage is impressed across the terminals of the switch and those of the corresponding discharge lamp. Two possibilities then arise:

1. The discharge lamp 1 or the stabilizing lamp 6 corresponding to the last closing switch 7 is defective. In this case the corresponding discharge lamp 1 cannot start and the line voltage applied across the terminals of the bimetallic switch 7 produce in it a gaseous electric discharge sufficient to heat the bimetallic strip 10 and maintain it in its open position.

The defectiveness of the lamp may be due to the rupture of its filamentary cathode. In such case, the gaseous discharge within the switch occurs between heating resistor 8 and contact 11. Where the defectiveness of the lamp is due to other causes than the rupture of its filamentary cathode, such as for instance, the breakage of the glass envelope, the discharge in the bimetallic switch occurs between heating resistor 8 and bimetallic strip 10 considered as one element and contact 11 considered as the other element. In either case, the heat developed by the discharge within the bimetallic switch is sufficient to maintain it in its open position. The flickering of the other discharge lamps 1 of the series is then prevented since the other switches 7 remain closed because of the reduced current flow and the lamps 1 do not start.

2. The discharge lamp 1 and the stabilizing lamp 6 corresponding to the last closing switch 7 are not defective. In this case the line voltage applied to the said discharge lamp will start it without preheat of its electrode 2 and the current will flow through the other bimetallic strips 10 causing them to move from their closed to their open circuit positions in sequence to start the other discharge lamps 1 until the bimetallic switch 7 corresponding to the defective lamp 1 or 6 opens. The whole series of lamps 1 and 6 then goes out and the starting cycle is repeated.

Thus, when a whole series of discharge lamps goes out and stays out, as in the first example above, and when the last closing switch 7 of the series is known, the manual switch 16 for that circuit component may be closed and the starting cycle of the lamps will be repeated to substitute discharge lamps for incandescent lamps except for the pair of lamps 1 and 6 controlled by the closed switch 16. The incandescent lamp 12 in this pair will continue to give light. The defective discharge lamp 1 or its stabilizing incandescent lamp 6 may then be replaced at a convenient time with a similar lamp capable of operation, and the switch 16 may then be opened to restore the circuit to its normal condition.

When a series of lamps first goes out and then repeats its starting cycle, as in the second example above, or when the series of lamps goes out and stays out as in the first example, and the last closing switch 7 is not known, all the switches 16 may be closed to pass to emergency illumination by the incandescent lamps 12. After all the bimetallic strips 10 have returned to their normally closed or inactivated positions, the defective lamps 1 or 6 may be located by opening the switches 16 in succession. The substitution of discharge lamps 1 and ballast lamps 6 for incandescent lamps 12, by opening switches 16 in succession, is continued until the switch 16 corresponding to the defective lamps 1 or 6 is opened. The opening of this particular switch 16 puts out all the lamps in the series. The said particular switch 16 may then be closed to substitute the emergency incandescent lamp 12 for the lamps 1 and 6, either of which may be defective, which makes possible the relighting of the remaining discharge lamps automatically in the manner described above. The entire series of discharge lamps is thus relit, with the exception of the particular defective lamp 1 for which the associated incandescent lamp 12 is lit instead.

Referring to Fig. 2, the switch 7 as illustrated comprises a heater 8 mounted in proximity to a bimetallic strip 10, whereof one end is fixed to a suitable lead-in and the free end normally rests against a fixed electrode 11; the whole is enclosed in a sealed glass tube 17 filled with helium at a certain pressure depending upon the line voltage. For example, for a line voltage of about 600 volts the pressure is of the order of one millimeter of mercury. During the electric discharge, the cathode glow surrounds the bimetallic strip and heats it; the discharge current is of the order of 5 milliamperes which corresponds to a power consumption of about 3 watts.

In the switch shown in Fig. 3 the bimetallic strip 10 and the heater 8 are mounted in a different manner. The heated bimetallic strip 10, instead of moving towards the resistance 8, as in Fig. 2, moves away from it, so that for equal time intervals, during which heating takes place and opening occurs, the distance between the electrodes 10 and 11 in normal operation is less, and the time taken by the bimetallic strip 10 to return to its rest position, after heating has ceased, is reduced.

Referring to Fig. 4 of the drawing, there is shown another operating circuit embodying the invention wherein a different bimetallic switch, denoted by the numeral 18, is utilized. The other elements in the circuit are similar to those shown in Fig. 1 and are denoted by like reference numerals. Only one lamp unit is shown in Fig. 4 for simplicity of illustration, the other units being indicated by the broken line. The switch 18 is shown in detail in Fig. 5 and comprises a sealed glass envelope, a main heating resistance 19 connected in series with the filamentary electrode 2, a bimetallic strip 20 in heat-receiving relation to the resistance 19, a second bimetallic strip 21 which engages strip 20 in the circuit closing position of the strips 20 and 21 shown in both figures.

Strip 21 is mounted so as to move in the same direction as strip 20 with changes in temperature external to the switch, this arrangement providing, in well-known fashion, a temperature compensating feature which corrects for such changes. The switch 18 also comprises an auxiliary contact 22 which is engaged by strip 20 when the latter is heated by the glow discharge in the switch, and an auxiliary heater resistance 23 which is in the circuit of the incandescent lamp 12.

The operation of the circuit of Fig. 4 is similar to that of Fig. 1, with the additional feature that the modified bimetallic switch shown therein automatically substitutes the incandescent lamp 12 for discharge lamp 1 whenever the latter is defective, instead of merely extinguishing discharge lamp 1 as in the circuit of Fig. 1. Assuming the first possibility of a defective discharge lamp given above, that is, that the discharge tube 1 or its ballast lamp 6 corresponding to the last closing switch 18 in the circuit becomes defective, the circuit voltage is applied across the terminals of the switch and a glow discharge starts therein which heats both bimetallic strips 20 and 21. Strip 20 comes to rest against and engages contact 22 thus connecting into the circuit the auxiliary heating resistance 23 and the incandescent lamp 12 which then gives light. The glow discharge is extinguished and the strip 20 is maintained in its position engaging electrode 22 by the heat emitted by resistances 19 and 23 which are connected in series across the terminals of the power source. The lamps 1 and 6 are thus shunted and the bimetallic strips 20 of the switches corresponding to the other discharge lamps 1 move to their open circuit positions in succession to effect starting of the other discharge lamps in the circuit. During normal operation of the lamps 1 the bimetallic strips 20 of the switches are maintained in a position intermediate bimetallic strips 21 and contacts 22 under the heat generated by the resistance 19.

Assuming the second possibility of a defective lamp given above, that is, that either a discharge lamp 1 or its ballast lamp 6 other than those corresponding to the last closing switch 18 becomes defective and ceases to function, the sequential operation of the circuit is as follows: the system voltage applied across the discharge lamp 1 associated with the last closing switch 18, starts it without any preheating of its electrodes; current then flows through the other bi-metallic switches of the series and brings about their opening and the starting of their associated discharge lamps, until the bi-metallic switch associated with the defective discharge lamp opens its contacts. The whole series of lamps then go out and the glow discharge which is set up in that bi-metallic switch heats strip 20 and causes it to bear against the electrode 22. The incandescent lamp 12 associated with the defective discharge lamp is then permanently substituted into the system for that discharge lamp, and the remaining discharge lamps of the series then light up again and the situation becomes identical with that occurring in the first possibility described above.

The final result under either possibility, is that the defective discharge lamp is permanently removed from the circuit and replaced by its associated incandescent lamp and the remaining discharge lamps of the series light up normally. When, through the operation of a bi-metallic switch, a defective discharge lamp has been automatically replaced by its associated incandescent lamp, the manual closing of switch 16 permits either eliminating definitely the defective element by short-circuiting the bi-metallic switch, or replacing the bi-metallic switch itself should it be the defective element.

In Fig. 5, the structure of the switch 18 is shown in detail wherein 24 is an insulating support on which is coiled the heating resistance 19. This support which may be made of a piece of mica or of braided glass thread, is intended to retard the heating of resistance 19 under the effect of the cathode glow during the glow discharge period. Contact 22 is made up of a tungsten wire the elasticity of which is increased by its being coiled at 25.

The bulb 18 contains hydrogen or helium at a pressure of 3 to 10 millimeter mercury. When the extinction of a discharge tube 1 is due to the breaking of the cathode filament 2, the glow discharge takes place between the heating resistance 19 that acts as a cathode and the bi-metallic strip 20 that acts as anode, until the bimetallic strip 20 is held in contact with contact 22 by the heat which is liberated in the two resistances 19 and 23. In all other cases where the extinction of a discharge tube 1 is caused by some other defect, the glow discharge takes place, on the one hand, between the strip 20 and the resistance 19 and the bimetallic strip 21. The glow discharge ceases as soon as the bimetallic strip 20 is in contact with the contact 22.

While I have shown and described my invention as applied to particular system of connections and as embodying various devices diagrammatically shown, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent of the United States is:

1. A thermal time-delay starting switch for electric discharge devices, said switch comprising an envelope having a gaseous ionizable medium sealed therein and containing a heating resistor, a heat-deformable contact strip mounted in heat receiving relationship to said resistor, and a fixed electrode cooperating with and normally engaging said deformable strip in its unactuated position, said deformable strip being adapted to bend away and disengage itself from said fixed electrode upon being heated, said heating resistor serving as one source of heat, and a discharge within said medium occurring between said fixed electrode and at least one of the two elements comprising said deformable strip and resistor serving as another source of heat, said deformable strip being proportioned such that each of said sources suffices to actuate it.

2. A thermal time-delay starting switch for electric discharge devices, said switch comprising an envelope having a gaseous ionizable medium sealed therein, and containing a heating resistor, a bimetallic contact strip mounted in heat receiving relationship to said resistor, and a fixed electrode cooperating with and normally engaging said bimetallic strip, said bimetallic strip being adapted to deform and break contact with said fixed electrode by bending away therefrom upon heating, said heating resistor serving as one source of heat within said switch, and a discharge within said medium between said fixed electrode for one part and said heating resistor and bi-metallic strip for another part, serving as a second source of heat within said switch, said deformable strip being proportioned such that each of said sources suffices to actuate it.

3. A thermal time-delay starting switch for electric discharge devices, said switch comprising an envelope having a gaseous ionizable medium sealed therein, and containing a main and an auxiliary heating resistor, a heat-deformable contact strip mounted in heat receiving relationship to said resistors and connected to one side of said auxiliary resistor, a fixed electrode cooperating with and normally engaging said heat deformable strip, a second fixed electrode mounted in the path of movement of said heat-deformable strip and connected to one side of said main resistor, said heat-deformable strip being adapted to bend away and break contact with said first electrode as a result of heat imparted to it by said resistor upon current flow therethrough, said heat-deformable strip being adapted to bend back further and make contact with said second electrode as a result of a greater quantity of heat imparted to it by a discharge occurring in said medium between said heat-deformable strip and said main resistor, thereby to connect both said resistors in series.

4. A thermal time-delay starting switch for electric discharge devices, said switch comprising an envelope having a gaseous ionizable medium sealed therein, and containing a main heating resistor, a heat-deformable contact strip mounted in heat receiving relationship to said resistor, a fixed electrode cooperating with and normally engaging said heat-deformable strip, said heat-deformable strip being adapted to break contact by bending away from said fixed electrode as a result of heat imparted to it from said resistor upon current flow therethrough, a second fixed electrode mounted in the path of movement of the free end of said heat-deformable strip and connected to one side of said main resistor, and an auxiliary heating resistor located in heat transfer relationship to said deformable strip and having one side connected thereto, said deformable strip being proportioned to bend back further and make contact with said second electrode as a result of a greater quantity of heat imparted to it by a discharge occurring in said medium between said deformable strip and said main resistor, thereby connecting both said resistors in series, and said auxiliary heater being proportioned such that the additional heat, developed upon current flow through it in series with said main resistor, is sufficient to maintain said deformable strip in engagement with said second electrode.

5. In combination, a plurality of electric discharge devices each comprising an envelope containing a gaseous ionizable medium and a pair of cooperating electrodes sealed therein, at least one of said electrodes being of the filamentary thermionic type and adapted to be heated by the passage of current therethrough prior to the starting of the device, a ballast impedance, means connecting said devices and said impedance in a series circuit, an incandescent lamp connected in a shunt circuit across each device and in series with its filamentary electrode, and a thermal starting switch for each of said devices, each of said switches comprising means including a heat-deformable contact strip contained in a sealed envelope and normally making the shunt circuit, means including a heating resistor serially connected into said series circuit causing actuation of said deformable strip to break the shunt circuit upon the energization of said series circuit in order to start the associated device, said switches having slight variations in their respective characteristics whereby to operate sequentially, and means in each switch permanently modifying the shunt circuit in the event of failure of the associated discharge device to conduct current, thereby to prevent blinking of the other discharge devices, said last-named means including a gaseous ionizable medium sealed into the switch envelope and capable of supporting a discharge for heating said strip and causing the actuation thereof.

6. In combination, a plurality of electric discharge devices each comprising an envelope containing a gaseous ionizable medium and a pair of cooperating electrodes sealed therein, at least one of said electrodes being of the filamentary thermionic type and adapted to be heated by the passage of current therethrough prior to the starting of the device, a ballast impedance, means connecting said devices and said impedance in a series circuit, an incandescent lamp connected in a shunt circuit across each device and in series with its filamentary electrode, and a thermal starting switch for each of said devices, each of said switches comprising means including a heat-deformable contact strip contained in a sealed envelope normally making the shunt circuit, means including a heating resistor serially connected into said series circuit causing actuation of said deformable strip to break the shunt circuit upon energization of the series circuit in order to start the associated device, said switches having slight variations in their respective characteristics whereby to operate sequentially, and means in each switch permanently breaking the shunt circuit in the event of failure of the associated device to conduct current, thereby to disable the series circuit and to prevent blinking of the other discharge devices, said last-named means including a gaseous ionizable medium sealed into the switch envelope and capable of supporting a discharge for heating said strip and causing the actuation thereof.

7. In combination, a plurality of electric discharge devices each comprising an envelope containing a gaseous ionizable medium and a pair of cooperating electrodes sealed therein, at least one of said electrodes being of the filamentary thermionic type and adapted to be heated by the passage of current therethrough prior to the starting of the device, a ballast impedance, means connecting said devices and said impedance in a series circuit, an incandescent lamp connected in a shunt circuit across each device and in series with its filamentary electrode, and a thermal starting switch for each of said devices, each of said switches comprising means including a heat-deformable contact strip contained in a sealed envelope normally making the shunt circuit, means including a heating resistor serially connected into said series circuit causing actuation of said deformable strip to break the shunt circuit upon the energization of said series circuit in order to start the associated device, said switches having slight variations in their respective characteristics whereby to operate sequentially, and means in each switch permanently remaking the shunt circuit in the event of failure of its associated device to conduct current, thereby to allow operation of the remaining discharge device in the series circuit with the substitution of its associated incandescent lamp for the defective device, said last-named means including a gaseous ionizable medium sealed into the switch envelope and capable of supporting a discharge for heating said strip and causing the actuation thereof.

8. In combination, a plurality of electric discharge devices each comprising an envelope containing a gaseous ionizable medium and a pair of cooperating electrodes sealed therein, at least one of said electrodes being of the filamentary thermionic type and adapted to be heated by the passage of current therethrough prior to the starting of the device, a ballast impedance, means connecting said devices and said impedance in a series circuit, an incandescent lamp connected in a shunt circuit across each device and in series with its filamentary electrode, said incandescent lamp having substantially the same current rating as its associated discharge device, and a thermal starting switch for each of said devices, each of said switches comprising means including a heat-deformable contact strip contained in a sealed envelope normally making the shunt circuit, means including a heating resistor in the switch envelope serially connected into said series circuit causing actuation of said deformable strip to break the shunt circuit upon energization of said series circuit in order to start the associated device, said switches having slight variations in their respective characteristics whereby to operate sequentially, and means in each switch permanently remaking the shunt circuit in the event of failure of its associated device to conduct current, thereby to permit normal operation of the remaining discharge devices of the series with substitution of its associated incandescent lamp for the defective device, said last-named means including a gaseous ionizable medium sealed into the switch envelope and capable of supporting a discharge for heating said strip and causing the actuation thereof to an extreme position and an electrode in said switch envelope disposed to engage said strip in said extreme position for remarking said shunt circuit.

9. In combination, a plurality of electric discharge devices each comprising an envelope containing a gaseous ionizable medium and a pair of cooperating electrodes sealed therein, at least one of said electrodes being of the filamentary thermionic type and adapted to be heated by the passage of current therethrough prior to the starting of the device, a ballast impedance, means connecting said device and said impedance in a series circuit, an incandescent lamp connected in a shunt circuit across each device and in series with its filamentary electrode, said incandescent lamp having substantially the same current rating as its associated discharge device, and a thermal starting switch for each of said devices, each of said switches comprising an envelope having sealed therein a bimetal strip and a first cooperating electrode normally making the shunt circuit, a main heating resistance included in said series circuit for heating said bimetal strip and breaking the shunt circuit in order to start the associated device, a gaseous ionizable medium for producing a glow to further heat said bimetal strip, and a second cooperating electrode disposed to engage said bimetal strip upon further heating thereof for remaking the shunt circuit in the event of failure of the associated device to conduct current, thereby to permit normal operation of the remaining discharge devices in the series circuit and substitution of its associated incandescent lamp for the defective device.

References Cited in the file of this patent

UNITED STATES PATENTS

| | | |
|---|---|---|
| 2,181,294 | Biggs | Nov. 28, 1939 |
| 2,266,619 | Campbell | Dec. 16, 1941 |
| 2,321,910 | Hays | June 15, 1943 |
| 2,324,906 | Clock | July 20, 1943 |
| 2,339,051 | Cates | Jan. 11, 1944 |
| 2,372,295 | Rubenstein | Mar. 27, 1945 |
| 2,438,557 | Hehenkamp | Mar. 30, 1948 |
| 2,462,306 | Cook | Feb. 22, 1949 |
| 2,482,442 | Strickland | Sept. 20, 1949 |